No. 861,087. PATENTED JULY 23, 1907.
H. J. CASE.
GRAIN HARVESTER.
APPLICATION FILED APR. 20, 1903.
3 SHEETS—SHEET 1.
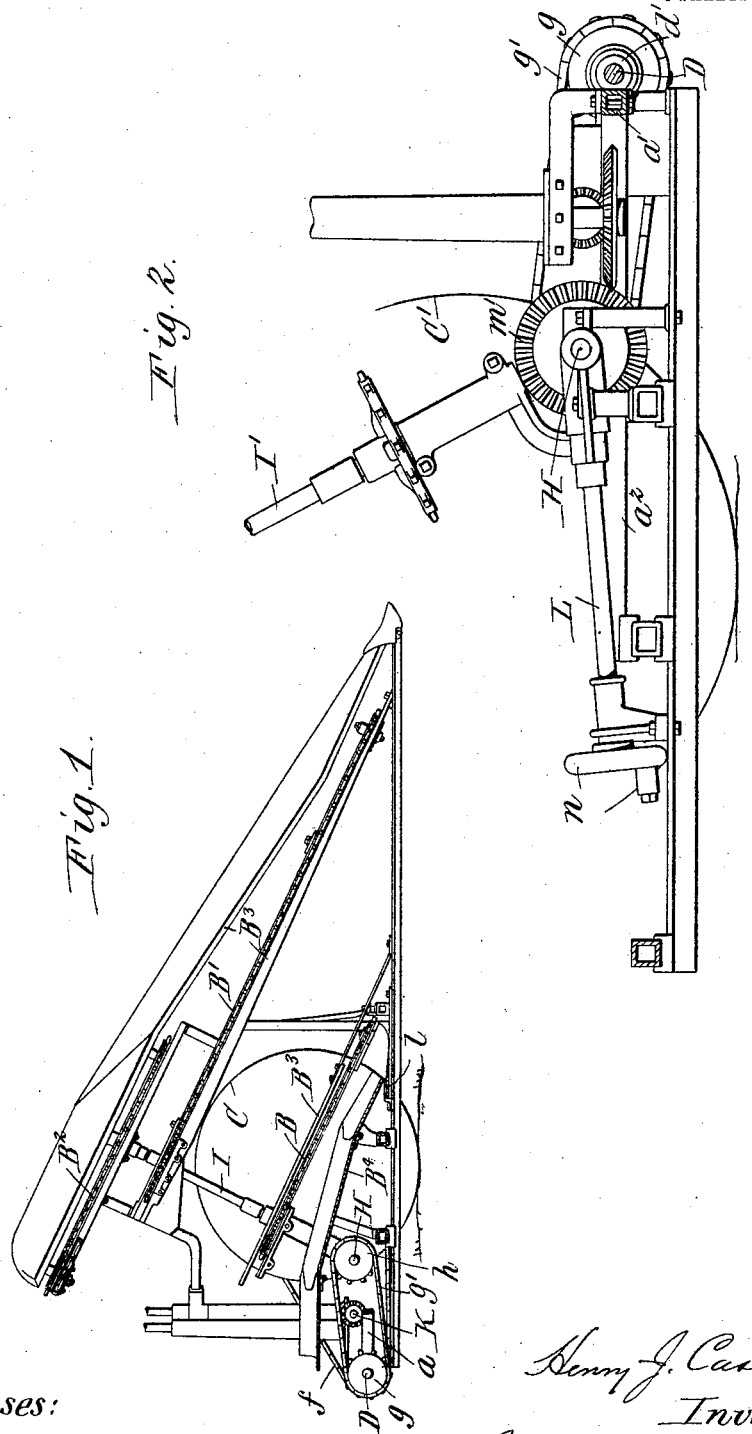
Witnesses:
E. A. Volk
R. W. Runser
Henry J. Case
Inventor.
By Wilhelm Bonner
Attorneys.

No. 861,087. PATENTED JULY 23, 1907.
H. J. CASE.
GRAIN HARVESTER.
APPLICATION FILED APR. 20, 1903.

3 SHEETS—SHEET 2.

Witnesses:
E. A. Volk.
R. W. Runser.

Henry J. Case Inventor.
By Wilhelm Bonner
Attorneys.

No. 861,087. PATENTED JULY 23, 1907.
H. J. CASE.
GRAIN HARVESTER.
APPLICATION FILED APR. 20, 1903.

3 SHEETS—SHEET 3.

Witnesses:

Inventor:

Attorneys.

UNITED STATES PATENT OFFICE.

HENRY J. CASE, OF OWASCO, NEW YORK, ASSIGNOR TO ADRIANCE PLATT & COMPANY, OF POUGHKEEPSIE, NEW YORK.

GRAIN-HARVESTER.

No. 861,087.  Specification of Letters Patent.  Patented July 23, 1907.

Application filed April 20, 1903. Serial No. 153,427.

*To all whom it may concern:*

Be it known that I, HENRY J. CASE, a citizen of the United States, and a resident of Owasco, in the county of Cayuga and State of New York, have invented a new and useful Improvement in Grain-Harvesters, of which the following is a specification.

This invention relates to that class of machines for harvesting Indian corn or maize and similar crops in which the stalks are conveyed from the cutter rearwardly to the binder mechanism in an approximately upright position and are bound in that position, and in which the moving parts of the machine, such as the cutter mechanism, the stalk conveying chains, and the binding mechanism are driven from a master wheel on the stubbleward side of the machine by means of a transverse counter shaft.

The object of this invention is to improve this means for driving the various mechanisms with a view of rendering the driving mechanism compact, simple, durable and efficient.

Figure 3:
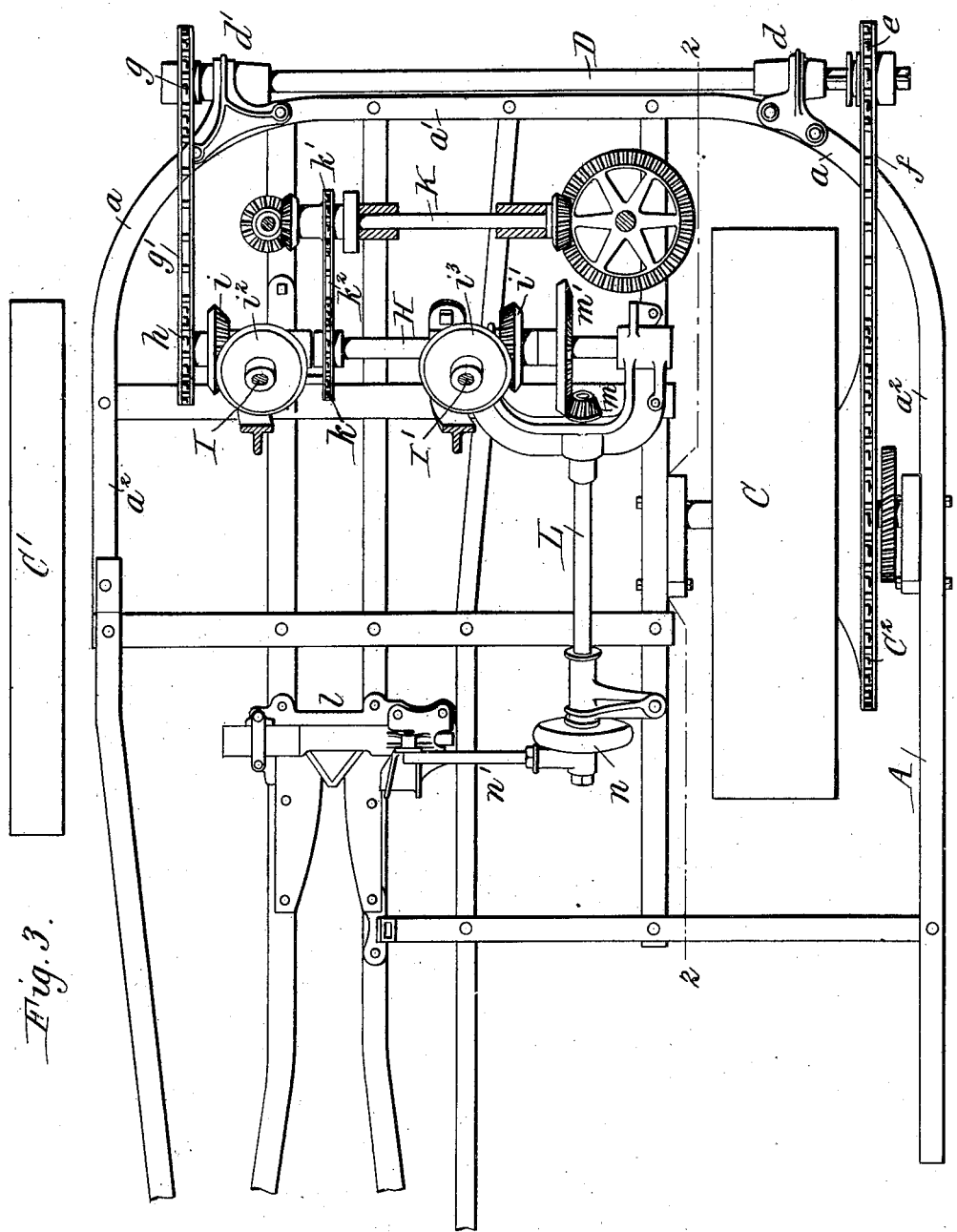
Figure 4:
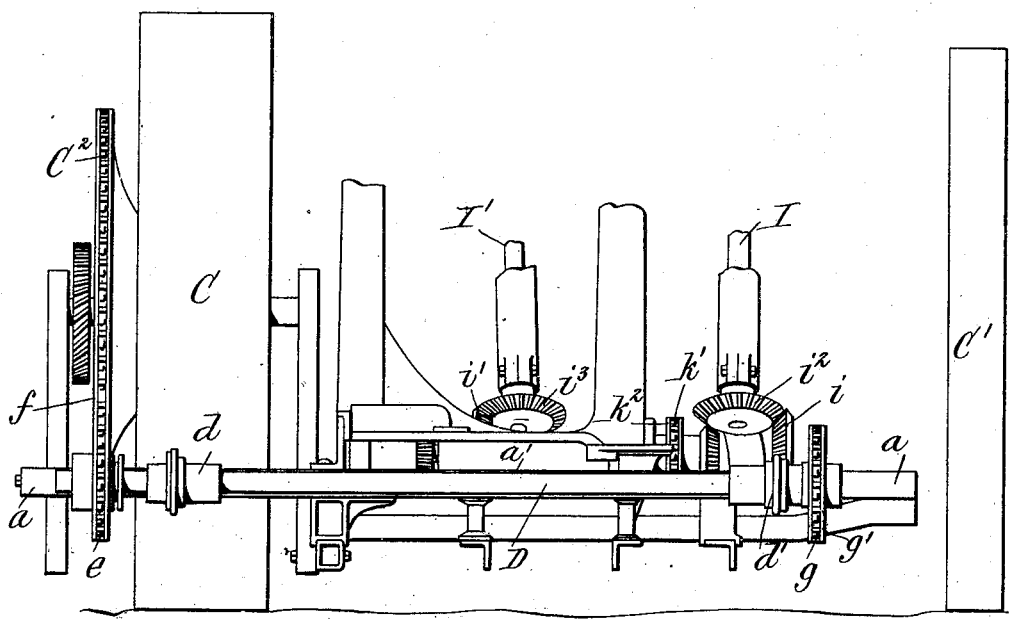

In the accompanying drawings, consisting of three sheets: Figure 1 is a diagrammatic sectional side elevation of the machine. Fig. 2 is a longitudinal side elevation of the rear portion of the machine, on an enlarged scale, in line 2—2, Fig. 3. Fig. 3 is a top plan view of the rear portion of the machine, on the same scale as Fig. 2. Fig. 4 is a fragmentary rear elevation of the machine.

Like letters of reference refer to like parts in the several figures.

A represents the main or base frame which has the rear portion of its outer or marginal bar preferably constructed of a single length, having a hollow square or other suitable cross section, and bent to form rounded corners $a$ connecting the rear cross sill $a'$ with the longitudinal sills $a^2$. B B' $B^2$ represent the carrying or propelling chains rising rearwardly, $B^3$ the gathering boards and $B^4$ the bottom of the stalk passage. All of these parts are of any suitable or well known construction and arrangement.

C represents the master wheel arranged on the stubble ward side of the frame and supported in any suitable manner.

C' represents the usual grainward supporting wheel.

$C^2$ represents the driving sprocket wheel secured to the master wheel on the stubbleward side thereof.

D represents the primary or main counter shaft arranged transversely outside of the main frame and in rear of the rear cross sill $a'$ thereof. This shaft is journaled in bearings $d$ $d'$ secured respectively to the rounded corners $a$ of the frame on the stubbleward and grainward sides thereof.

$e$ represents a sprocket pinion secured to the stubbleward end of the counter shaft D in line with the driving sprocket wheel C, and $f$ represents the drive chain which extends rearwardly from the driving sprocket wheel to this pinion.

$g$ represents a sprocket wheel secured to the grainward end of the counter shaft and $g'$ a drive chain which extends forwardly from this wheel to a sprocket wheel $h$ on the grainward end of a secondary or intermediate transverse shaft H. The latter is arranged within the main frame, forwardly of the rear cross sill $a'$ thereof and grainward of the master wheel.

$i$ and $i'$ represent bevel gear wheels secured to the secondary or intermediate counter shaft H, respectively near the grainward and stubbleward ends thereof, and meshing with bevel wheels $i^2$ $i^3$, respectively, on the lower ends of forwardly leaning shafts I I' by which the stalk conveyer chains on opposite sides of the stalk passage and other stalk feeding devices are actuated.

K represents a transverse shaft which is arranged within the frame and in rear of the intermediate shaft H for driving the binder mechanism. This shaft is driven from the intermediate shaft H by a sprocket wheel $k$ on the latter, a sprocket wheel $k'$ on the shaft K and a drive chain $k^2$. The upright shafts of the binder mechanism are driven from this transverse shaft K in a well known manner.

L represents the longitudinal crank shaft by which the cutter $l$ is operated and which is arranged between the master wheel and the stubbleward inclined shaft I'. This crank shaft is driven at its rear end from the stubbleward end of the intermediate shaft H by bevel wheels $m$ $m'$ and is provided at its front end with the usual crank wheel $n$ connected with the cutter $l$ by the pitman $n'$.

The arrangement of the primary or main counter shaft D in rear of the rear cross sill of the main frame renders the driving mechanism very convenient and easily accessible, the master wheel is left unencumbered on its grainward side and ample space is afforded within the frame, grainward of the master wheel, for the transverse intermediate shaft, the transverse driving shaft of the binder mechanism, and the longitudinal crank shaft of the cutter mechanism.

I claim as my invention:

1. The combination of a main frame, a master wheel on the stubbleward side thereof, a main counter shaft arranged in rear of said frame and extending from the stubbleward to the grainward side thereof, bearings which project rearwardly from said frame and receive the main counter shaft, a secondary transverse counter shaft arranged within the frame grainward of the master wheel, upright shafts for the stalk conveyers geared at their lower ends to the secondary counter shaft, and transmitting mechanisms extending from the master wheel rearwardly to the main counter shaft and from the latter forwardly to the secondary counter shaft, substantially as set forth.

2. The combination of a main frame, a master wheel, a main counter shaft arranged transversely in rear of said wheel, a secondary counter shaft arranged transversely in front of said main counter shaft, upright shafts for the stalk conveyers geared at their lower ends to said secondary counter shaft, a horizontal driving shaft arranged transversely between said counter shafts, a binder mechanism driven from said horizontal driving shaft, and transmitting mechanisms extending from the master wheel rearwardly to the main counter shaft, from the latter forwardly to the secondary counter shaft, and from the latter rearwardly to said horizontal transverse shaft, substantially as set forth.

3. The combination of a main frame, a master wheel on the stubbleward side thereof, a main counter shaft arranged transversely in rear of said frame and extending from the stubbleward to the grainward side thereof, a transmitting mechanism extending from the master wheel rearwardly to said main counter shaft, a secondary counter shaft arranged transversely within said frame grainward of the master wheel, a transmitting mechanism extending from said main counter shaft to said secondary shaft, at the grainward side thereof, upright shafts for the stalk conveyers geared at their lower ends to said secondary counter shaft, a horizontal transverse shaft arranged between said counter shafts and driven from one of said shafts, a binder mechanism driven from said horizontal transverse shaft, and a longitudinal crank shaft for the cutter mechanism geared with the stubbleward end of the secondary counter shaft, substantially as set forth.

Witness my hand, this 14th day of April, 1903.

HENRY J. CASE.

Witnesses:
LLOYD JOHNSON,
C. E. GUFFIN.